US012600652B2

(12) United States Patent
Coleman

(10) Patent No.: US 12,600,652 B2
(45) Date of Patent: Apr. 14, 2026

(54) METHOD FOR MAINTAINING ACCURATE AND PRECISE SURFACE WASTING FLOW CONDITIONS USING AN AUTOMATED OVERFLOW WEIR

(71) Applicant: DENTRO-P, LLC, Yakima, WA (US)

(72) Inventor: Thomas E. Coleman, Yakima, WA (US)

(73) Assignee: DENTRO-P, LLC, Yakima, WA (US)

( * ) Notice: Subject to any disclaimer, the term of this patent is extended or adjusted under 35 U.S.C. 154(b) by 425 days.

(21) Appl. No.: 18/109,844

(22) Filed: Feb. 14, 2023

(65) Prior Publication Data

US 2023/0257289 A1     Aug. 17, 2023

Related U.S. Application Data

(60) Provisional application No. 63/309,802, filed on Feb. 14, 2022.

(51) Int. Cl.
 *C02F 3/00*          (2023.01)
 *C02F 3/12*          (2023.01)
(52) U.S. Cl.
 CPC ............ *C02F 3/006* (2013.01); *C02F 3/1236* (2013.01); *C02F 2209/006* (2013.01); *C02F 2209/42* (2013.01); *C02F 2301/022* (2013.01)
(58) Field of Classification Search
 CPC .... B01D 21/2433; C02F 3/006; C02F 3/1263; C02F 2209/005; C02F 2209/006; C02F 2301/022

USPC ................................................ 210/776, 614
See application file for complete search history.

(56) References Cited

U.S. PATENT DOCUMENTS

| | | | |
|---|---|---|---|
| 4,405,458 A * | 9/1983 | McHugh, Jr. ...... | B01D 17/0214 |
| | | | 210/242.1 |
| 4,645,592 A | 2/1987 | Calltharp et al. | |
| 4,775,467 A | 10/1988 | Calltharp et al. | |
| 8,568,592 B2 | 10/2013 | Coleman | |
| 11,643,348 B2 | 5/2023 | Coleman | |
| 11,807,562 B2 | 11/2023 | Coleman | |
| 2023/0257290 A1 | 8/2023 | Coleman | |

FOREIGN PATENT DOCUMENTS

WO        WO-8800856 A1 *   2/1988

\* cited by examiner

*Primary Examiner* — Claire A Norris
(74) *Attorney, Agent, or Firm* — Svendsen Legal, LLC

(57)          ABSTRACT

A method for the treatment of municipal wastewater by an activated sludge process that uses an overflow weir to extract waste flows from the surface of aeration basins, which is especially useful for continuous-flow treatment systems. A downward opening overflow weir is precisely controlled to remove a surface wasting flow from the aeration basin with the weir automatically moved up and down to accurately and precisely maintain a desired depth of flow over the weir, preferably with a microprocessor-based controller executing a control algorithm based on variable inputs to provides for accurate and precise control of the depth of surface wasting flow over the weir, without excessive oscillation of the overflow weir's movement and the resultant excessive oscillation in the depth of flow over the weir.

12 Claims, 6 Drawing Sheets

Basic Activated Sludge Process 10A

Waste Activated Sludge to Digestion 17

Return Activated Sludge (RAS)

Clarifier 25

Clarifier Effluent to disinfection 19

Aeration Basin 12

Mixed Liquor (activated sludge) 11

9 Influent

EBPR Process with
Surface Wasting Flow
10C

Surface Wasting
15 Overflow Weir

20 Mixed Liquor Surface Waste

41 Aeration Basin
Surface

Weir Box
16

Microprocessor-Based
Controller

Automatic
Weir Actuator
35

30

Overflow Weir
Crest 36

Aeration Basin
Elevation Sensor 42

Aerated Zone 14

Aeration Basin 12

Activated Sludge 13

Method for Maintaining Accurate and Precise Surface Wasting Flow
Conditions from an Activated Sludge Aeration Basin
Using an Automated Overflow Weir     100

METHOD FOR MAINTAINING ACCURATE AND PRECISE SURFACE WASTING FLOW CONDITIONS USING AN AUTOMATED OVERFLOW WEIR

TECHNICAL FIELD

The present disclosure relates to and is applicable to the treatment of municipal wastewater by an activated sludge process that uses an overflow weir to extract waste flows from the surface of aeration basins. It is particularly applicable to the control of overflow weirs in continuous-flow activated sludge treatment systems that utilize "plug flow" aeration basin configuration or a "race track" continuous loop reactor basin configuration, commonly referred to as an "oxidation ditch." It may also be applied to overflow weirs employed in other activated sludge process configurations, such as sequencing batch reactors with similar benefits as described herein.

BACKGROUND OF THE INVENTION

The activated sludge treatment process has been used for many years for the removal of biochemical oxygen demand (BOD) from municipal wastewaters. This conventional process consists of an aeration basin containing a suspension of microorganisms referred to as mixed liquor. Wastewater is fed to the aeration basin and oxygen is utilized by the biomass to sorb, assimilate, and metabolize the BOD available in the wastewater. From the aeration basin mixed liquor flows to a clarifier where the biomass settles and treated wastewater overflows. Most of the settled biomass is returned to the aeration basin. A smaller portion is wasted in order to maintain a relatively constant level of biomass in the system. The activated sludge process has been extensively described in prior literature and textbooks.

A schematic process flow diagram of a typical, generic or basic activated sludge process 10 is shown in FIG. 1, which receives in influent 9, of a municipal waste stream. A suspension of bacteria and other microorganisms referred to as a "mixed liquor" 11 received into and maintained in an aeration basin 12, for conversion into an "activated sludge" 13. The aeration basin effluent flows to a clarifier 25, where the mixed liquor settles and is returned to the aeration basin, where the clarified effluent 19 as a treated wastewater overflows the clarifier for optional additional treatment, disinfection, and then disposal. A small fraction of the settled mixed liquor is wasted from the system 17, typically to a digestion process, in order to maintain the desired concentration of mixed liquor in the aeration basin.

Activated sludge systems offer cost-effective wastewater treatment for small municipalities, and thousands of such plants exist in the United States and around the world today. The typical process is characterized by an aeration basin in which aeration and mixing of the biological solids or "mixed liquor suspended solids" (MLSS) is maintained. Various types of mechanical equipment have been used to provide mixing and aeration. Commonly used aeration and mixing systems include surface aerators, and diffused aeration grids that are sometimes coupled with mechanical mixers.

Generally, these conventional activated sludge systems are simple to operate, provide a high-quality effluent in terms of low "biochemical oxygen demand" (BOD) and suspended solids. Additionally, these conventional systems can handle variable loads, and are economical for a wide range of plant sizes. Drawbacks to the more basic activated sludge systems include a tendency to produce and retain foam on the surface of the reactor basins, and to develop a mixed liquor with poor settling properties. These poor settling conditions are typically referred to as "bulking sludge". An objective of the present invention disclosed herein, is to alleviate these problems, which can often adversely affect the operation and performance of activated sludge processing systems.

Activated sludge systems, especially extended aeration systems often develop poor settling sludge as indicated by high "sludge volume index" (SVI) values and accumulation of foam on the surface of the aeration basins. The SVI is the volume in milliliters (mL) occupied by one gram of sludge after 30 minutes of settling of a 1.0 liter or 2.0 liter mixed liquor sample. The high SVI values are usually associated with significant levels of filamentous bacteria within the activated sludge "floc" or flocculent. These filamentous bacteria can also create nuisance foam accumulation on the surface of aeration basins and clarifiers.

Many design and operating strategies have been employed which attempt to select against the growth of filamentous bacteria. One such method is to waste some or all of the excess mixed liquor solids as the waste activated sludge, from the surface of the aeration basin instead of from the underflow of the clarifier as is the most common practice. In aeration basins using diffused air, filamentous bacteria and other foam causing organisms are more readily brought to the surface by the small air bubbles and become more abundant in the top layer of the water contained in the basin. When wasting is done continuously or semi-continuously, typically from the top 1 cm to 2 cm of the aeration basin, the filamentous bacteria and other foam causing organisms will be wasted in greater proportion than better settling bacteria and, therefore, "selected" against. In order to work effectively as selective process, the surface wasting must be accomplished by accurately and precisely controlling the depth of flow over the surface wasting weir, typically within the optimal range of depth, of 1 cm to 2 cm.

Because the aeration basin influent flow and aeration rates are constantly changing, it is not possible to maintain the desired depth of flow over a surface wasting weir in a narrow range with a fixed or manually adjusted weir mechanism. Current practice for automating such an overflow weir would be to continuously measure the water level in the basin and use that measurement as an input to an automated weir actuator. However, due to the inherent lag times which occur in sending the level measurement to the actuator and then moving the weir based on that measurement it is not possible to accurately maintain the depth of flow over the weir within the desired narrow range of 1 cm to 2 cm. Attempting to control the weir from the basin water level measurement alone will invariably result in excessive oscillation of the water level over the weir, which travels well outside of the desired range. The present invention will overcome this inherent limitation in disclosing a method to accurately and precisely control the depth of flow over a surface wasting weir.

Biological nitrogen removal can be achieved in activated sludge systems by controlling the aeration conditions within the reactor tanks. Human activities can accelerate the rate at which nutrients enter ecosystems. It is becoming increasingly common for regulatory agencies to impose limits on phosphorus as well as nitrogen on discharges from wastewater treatment plants. The basic engineering principles for the design of P and N removal treatment facilities have been well established and have been implemented in various configurations including, the "Modified Bardenpho Process", the "UCT Process", the "A2O Process", and others.

The Modified Bardenpho Process 10A configuration of the Basic Activated sludge process is shown in FIG. 2. This process typically includes one or more anaerobic zones, followed by one or more anoxic zones and one or more aerobic zones. Process designs based upon the Modified Bardenpho Process typically include one or more anaerobic zones to promote "enhanced biological phosphorus removal" (EBPR), and also provides strong selective pressure against filamentous bacteria growth while at the same time promoting the growth of a denser, better settling biomass, a portion of which may include "aerobic granular sludge" (AGS). In these situations, the present invention will meet the need to facilitate efficient and effective surface wasting, and will further help select against the growth of filamentous bacteria, but more importantly will help select for the denser constituents of the mixed liquor biomass, including aerobic granular sludge.

SUMMARY OF THE INVENTION

The present invention precisely controls a downward opening overflow weir that removes a surface wasting flow from the aeration basin of an activated sludge treatment system. For the present invention, the overflow weir can be automatically moved up and down with a mechanical actuator device, to accurately and precisely maintain a desired depth of flow over the overflow weir, preferably within an optimal, narrow range of approximately 1 cm to 2 cm.

For the method of the present invention, vital process variables are input, most preferably to a microprocessor-based controller. These process variables include the elevation of the liquid surface in the aeration basin and the independently measured elevation of the crest of the surface wasting, overflow weir. A control algorithm based on these two independent measured variable inputs provides for accurate and precise control of the depth of surface wasting flow over the overflow weir, without excessive oscillation of the overflow weir's movement and the resultant excessive oscillation in the depth of flow through the overflow weir.

A primary purpose of the surface wasting, overflow weir in the activated sludge treatment system is to create a laminar flow of the mixed liquor suspension over the surface of the aeration basin towards the weir crest. If the differential between the water surface elevation in the basin is not accurately and precisely maintained, the depth of the waste flow over the overflow weir will oscillate at an undesirably wide range. When the waste flow depth oscillates to a depth greater than the desired and optimal range, upwelling will occur that draws mixed liquor from a greater depth within the aeration basin rather than from across the surface, as intended.

If the overflow depth is continuously oscillating above and below the desired set point range, the surface wasting process will not be effective in selecting against the growth, especially if filamentous bacteria are present, and in selecting for the retention and growth of the denser constituents of the activated sludge mixed liquor, including aerobic granular sludge.

A primary feature of the method of the present invention employs a control algorithm executed in an integral, microprocessor-based controller. The control algorithm is based on measured process variables, including a water surface elevation in the aeration basin and a weir crest elevation, together with derived variables including but not limited to, the first and second derivatives of the rate of change in the water surface level in the aeration basin. Accurate and precise control of the depth of flow over the surface wasting weir with these sensed and continuously monitored variables greatly improves overall process control and efficiencies.

Key objectives of the present invention include accurately and precisely maintaining a desired depth of flow over the weir within a narrow range of approximately 1 cm to 2 cm to withdraw a portion of the activated sludge mixed liquor from the aeration basin, and creating a laminar flow of the mixed liquor suspension over the surface of the aeration basin towards the weir crest and in this manner remove it as "waste activated sludge" (WAS) from the system.

The present invention can be incorporated into existing or new activated sludge wastewater treatment systems, to better achieve or improve "enhanced biological phosphorus removal" (EBPR), and "biological nitrogen removal" (BNR), by improving the settling of the activated sludge, along with increased energy efficiency.

BRIEF DESCRIPTION OF THE DRAWINGS

Exemplary embodiments of the technology will become more fully apparent from the following descriptions and appended claims, taken in conjunction with the accompanying drawings. Understanding that these drawings depict only exemplary embodiments and are, therefore, not to be considered limiting of the scope of the technology, the exemplary embodiments will be described with additional specificity and detail through use of the accompanying drawings in which:

Figure 1:
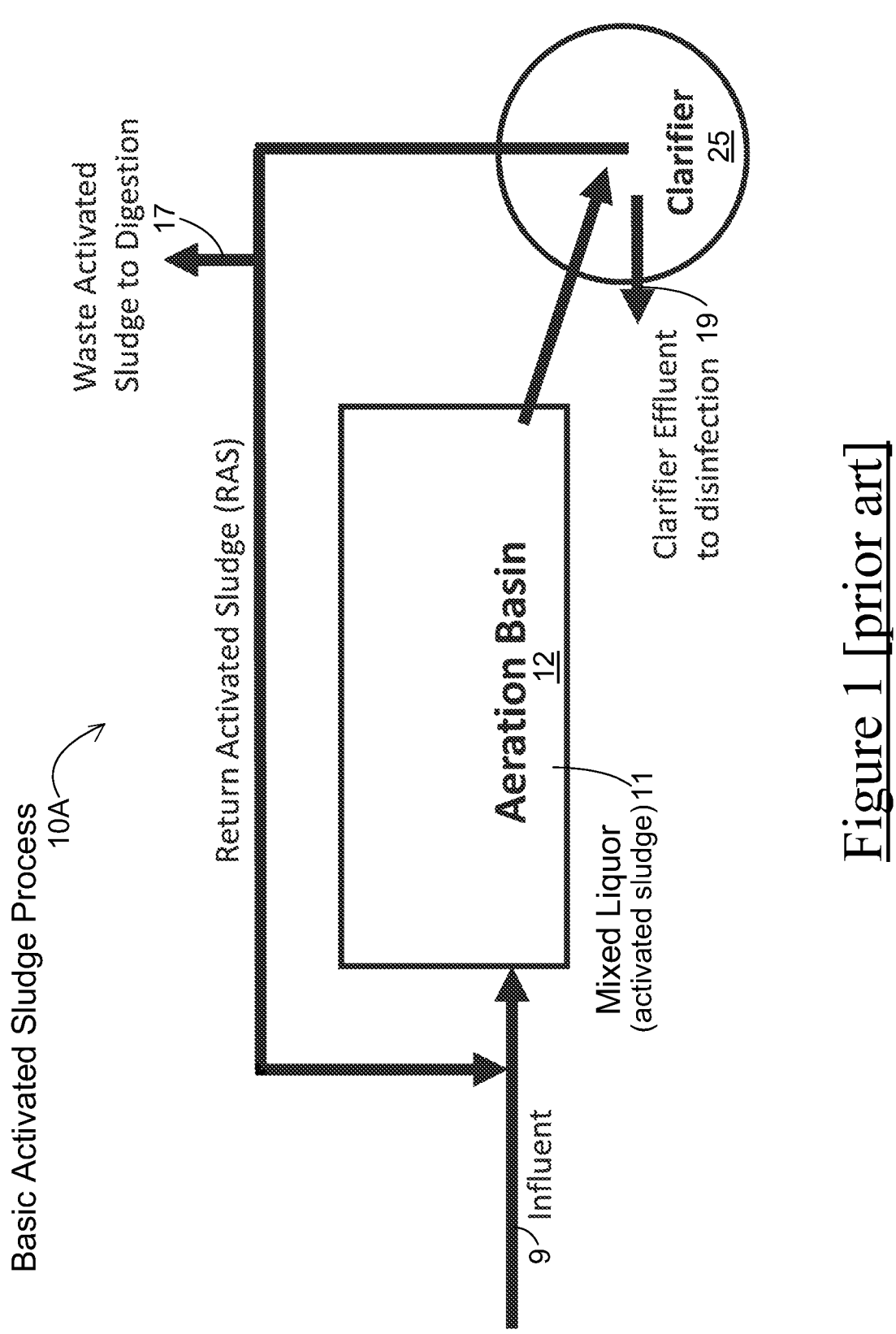
FIG. 1 is a prior art schematic diagram of a basic activated sludge process.
Figure 2:
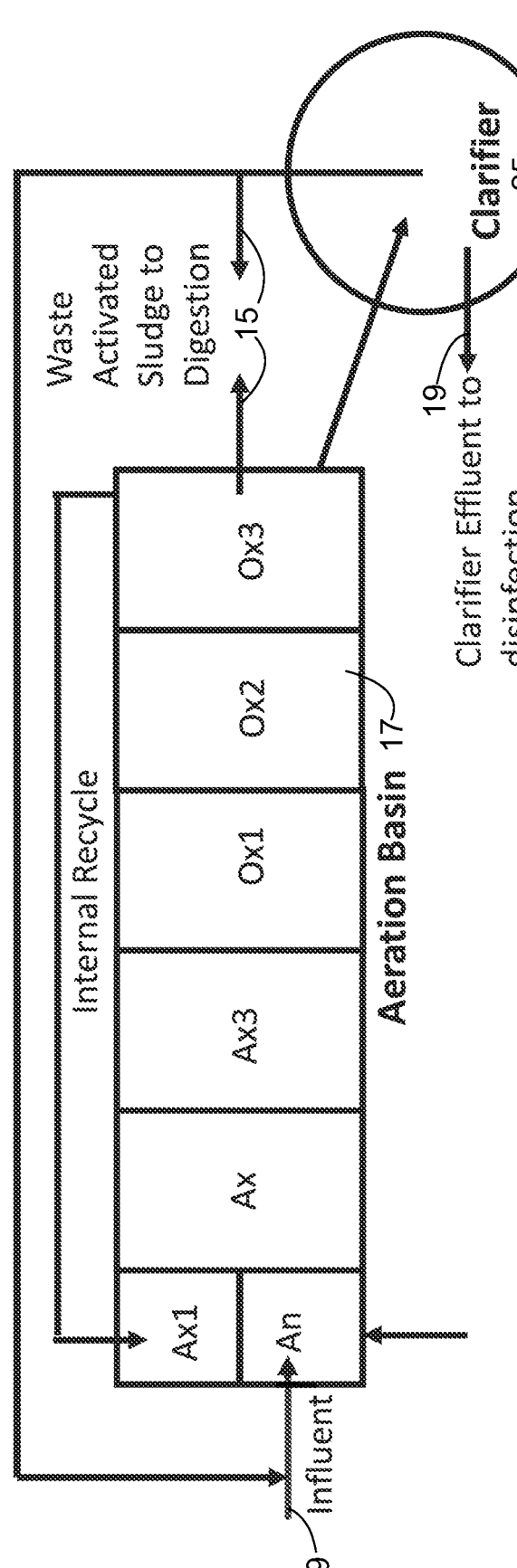
FIG. 2 is a prior art schematic diagram of is a schematic diagram of the "Modified Bardenpho process" for enhanced biological phosphorus removal and nitrogen removal using an activated sludge process.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations. Details that are not necessary for an understanding of the present invention by one skilled in the technology of the invention, or render other details difficult to perceive, may have been omitted.

DETAILED DESCRIPTION OF SPECIFIC EMBODIMENTS

The present invention pertains to a method of operating an automated surface wasting, overflow weir with a microprocessor-based controller. More specifically, the method of the present invention includes maintaining accurate and precise surface wasting flow conditions from an activated sludge aeration basin using an automated overflow weir. The present invention can be applied to new and existing activated sludge process configurations, to achieve improved performance in the basic activated sludge process as well as "enhanced biological phosphorus removal" (EBPR) and biological nitrogen removal systems, to improve settling of the activated sludge and improving operational energy efficiency by the system.

A technical description of the present invention is provided herein by way of example. However, it should be noted that other similar configurations and components could be utilized in applying this method. Exemplary embodiments of the "method for maintaining accurate and precise surface wasting flow conditions using an automated overflow weir", or more simply referred to herein as the "automated overflow weir method of the present invention" 100, and will be best understood by reference to the drawings included herewith, wherein like parts are designated by like numerals throughout. It will be readily understood that the components of the apparatus elements employed in the automated overflow weir method of the present invention, as generally described and illustrated in the figures herein, could be arranged and designed in a wide variety of different configurations. Thus, the following more detailed description of the embodiments of the apparatus, system, and method is not intended to limit the scope of the invention, as claimed, but is merely representative of exemplary embodiments of the technology.

FIGS. 3 through 6, show features and steps of the automated overflow weir method of the present invention 100, as can be applied to new and existing oxidation ditch treatment process designs and other activated sludge process configurations, as noted herein above. Again, it should be noted that other similar process configurations could be utilized in applying embodiments of the novel method steps disclosed and described herein.

Figure 3:
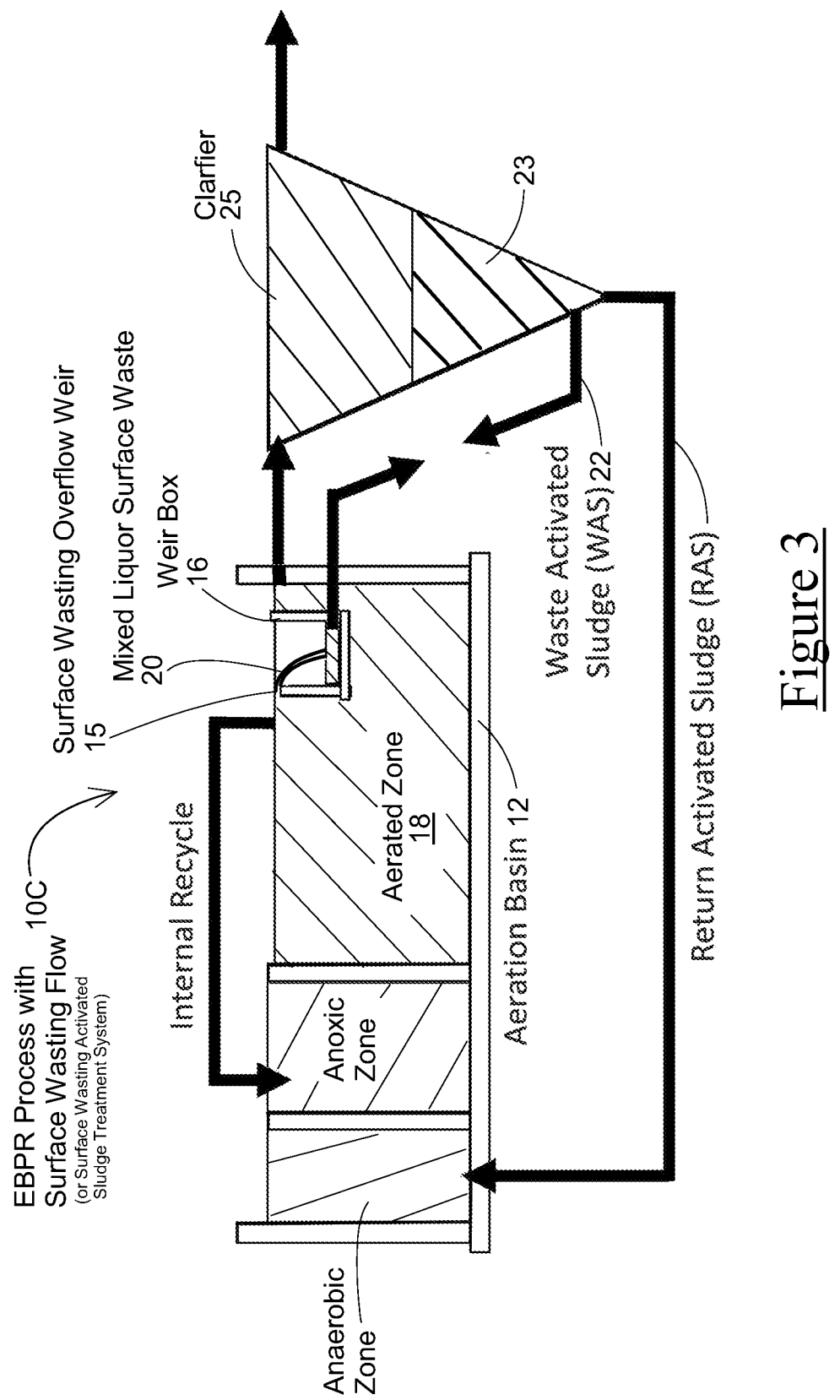
FIG. 3 is a schematic diagram illustrating a conventional surface wasting weir, as installed in an activated sludge aeration basin with a surface wasting flow.

FIG. 3 is a diagram illustrating an EBPR Process with Surface Wasting Flow 10C, which also may be referred to herein as a "Surface Wasting Activated Sludge" (SWAS) Treatment System". A key component of this system is use of a Surface Wasting Overflow Weir 15, which may be simply referred to herein as an "Overflow Weir". The SWAS Treatment System processes a Mixed Liquor 11 within an "Aeration Basin" 12, which is able to incorporate the automated overflow weir method of the present invention 100. The Aeration Basin typically includes several "zones" of processing the Mixed Liquor of biological solids, commonly referred to as "municipal wastewater". One zone of processing within the typical Aeration Basin is an "Aerated Zone" 14. As shown in a preferable configuration in FIG. 3, the Aerated Zone contains the Mixed Liquor, which is converting to an Activated Sludge 13.

The Aeration Basin 12 also includes the Overflow Weir 15, which is most preferably a downward opening gate mechanism for removing or wasting the topmost Activated Sludge 13 from the Aeration Basin. The Overflow Weir is the inlet element of a Weir Box 16, shown in FIG. 3 as part of the Aerated Zone of the Activated Sludge containing Aeration Basin in the (SWAS) Treatment System 10C.

From the Overflow Weir 15, a flow of a "Mixed Liquor Surface Waste" 20 spills over the Overflow Weir. The Mixed Liquor Surface Waste can then be combined with a "Waste Activated Sludge" (WAS) 22, which are the settled solids 23 drained from the Clarifier 25 processing component, typically located downstream of the Aeration Basin.

Figure 4:
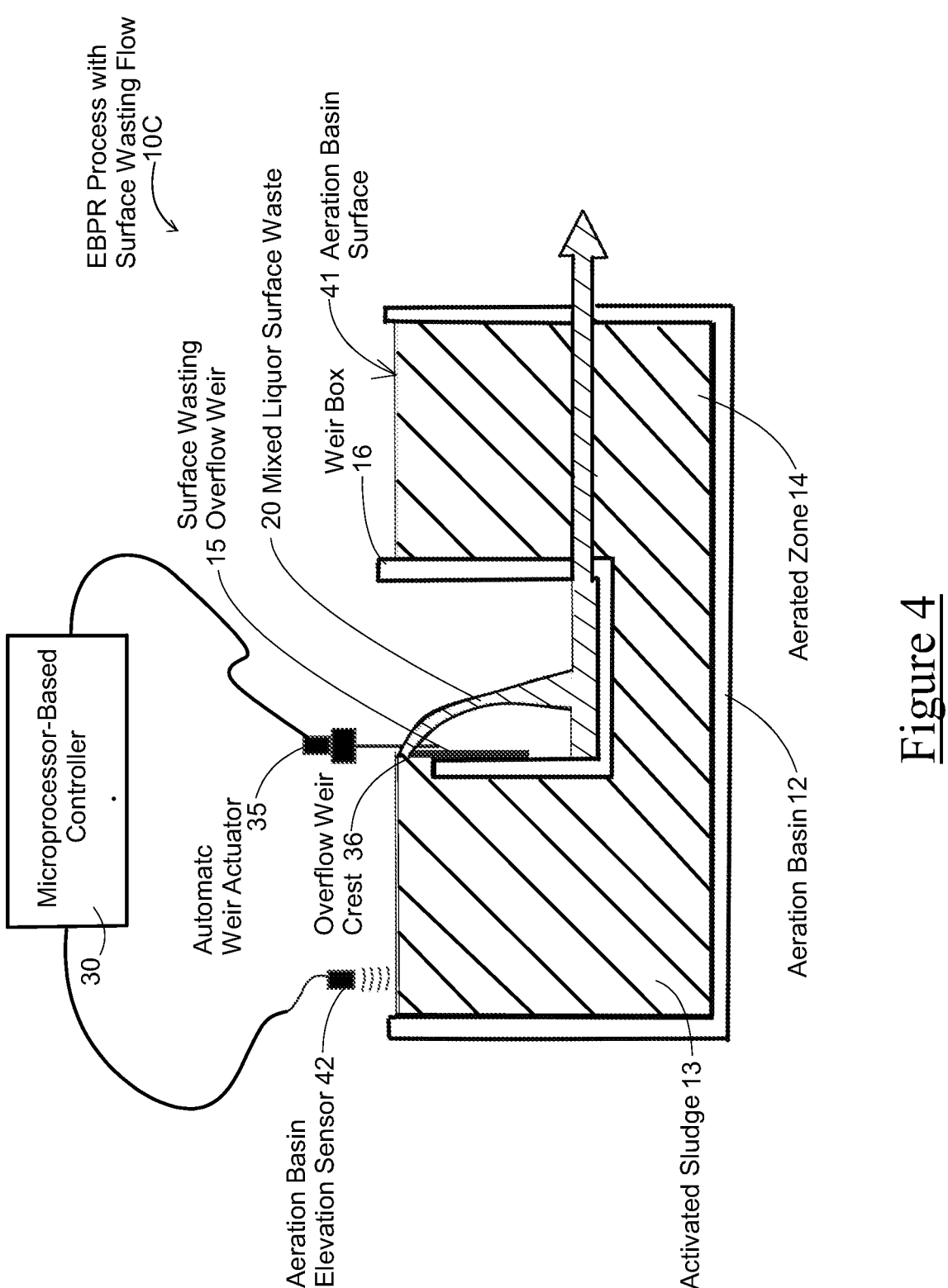
FIG. 4 is a schematic diagram detailing overflow weir components of an automated overflow weir method, as installed in an activated sludge aeration basin with a surface wasting flow, in an embodiment of the present invention.

A Microprocessor-Based Controller 30 serves to monitor and control the action of the Overflow Weir 15, with the automated overflow weir method of the present invention 100 precisely controlling the downward opening and upward closing, Overflow Weir 15 shown in FIG. 4. Again, the Overflow Weir removes the Mixed Liquor Surface Waste 20 from the Aeration Basin 12 of the Activated Sludge Treatment System 10. As shown in FIG. 4, the Overflow Weir moves up and moves down with an Automatic Weir Actuator 35, which directly controls an Overflow Weir Crest 36.

The Automatic Weir Actuator 35 is most preferably either an electrically or hydraulically driven mechanism, as are well known to those skilled in actuator design and selection. With the use of the Automatic Weir Actuator 35 under the direction of the Microprocessor-Based Controller 30, the Overflow Weir 15 is moved up and moved down automatically, to accurately and precisely maintain a desired depth of a flow of the Mixed Liquor Surface Waste 20, spilling over the Overflow Weir Crest 36 within a narrow range, most preferably with a "Waste Flow Depth" 37 at a targeted flow depth in the range of approximately 1 cm to 2 cm.

In an alternative embodiment of the automated overflow weir method of the present invention 100, the surface wasting Overflow Weir 15 could include equally spaced "V-notches" at the Overflow Weir Crest 36, to improve accuracy and precision of flow over the Overflow Weir. Optionally, the V-notches may be oriented at either a 45 degree, 60 degree, or 90 degree angle relative to the flow of the Mixed Liquor 11 across the Overflow Weir Crest, as could be optimized and selected for each configuration and composition of the processed Mixed Liquor.

In another an alternative embodiment of the automated overflow weir method of the present invention 100, the surface wasting Overflow Weir 15 may be operated intermittently, either at recurring intervals, or may be operated during specific time periods within each 24-hour period.

In yet another an alternative embodiment of the automated overflow weir method of the present invention 100, the surface wasting Overflow Weir 15 may be a multiple of Overflow Weirs, each installed in a multiple of separate Aeration Basins 12, each operating in parallel, and each with surface wasting Overflow Weirs, together forming a "process train" controlled independently, or each surface wasting Overflow Weir controlled in a coordinated manner among the parallel treatment process trains.

Figure 5:
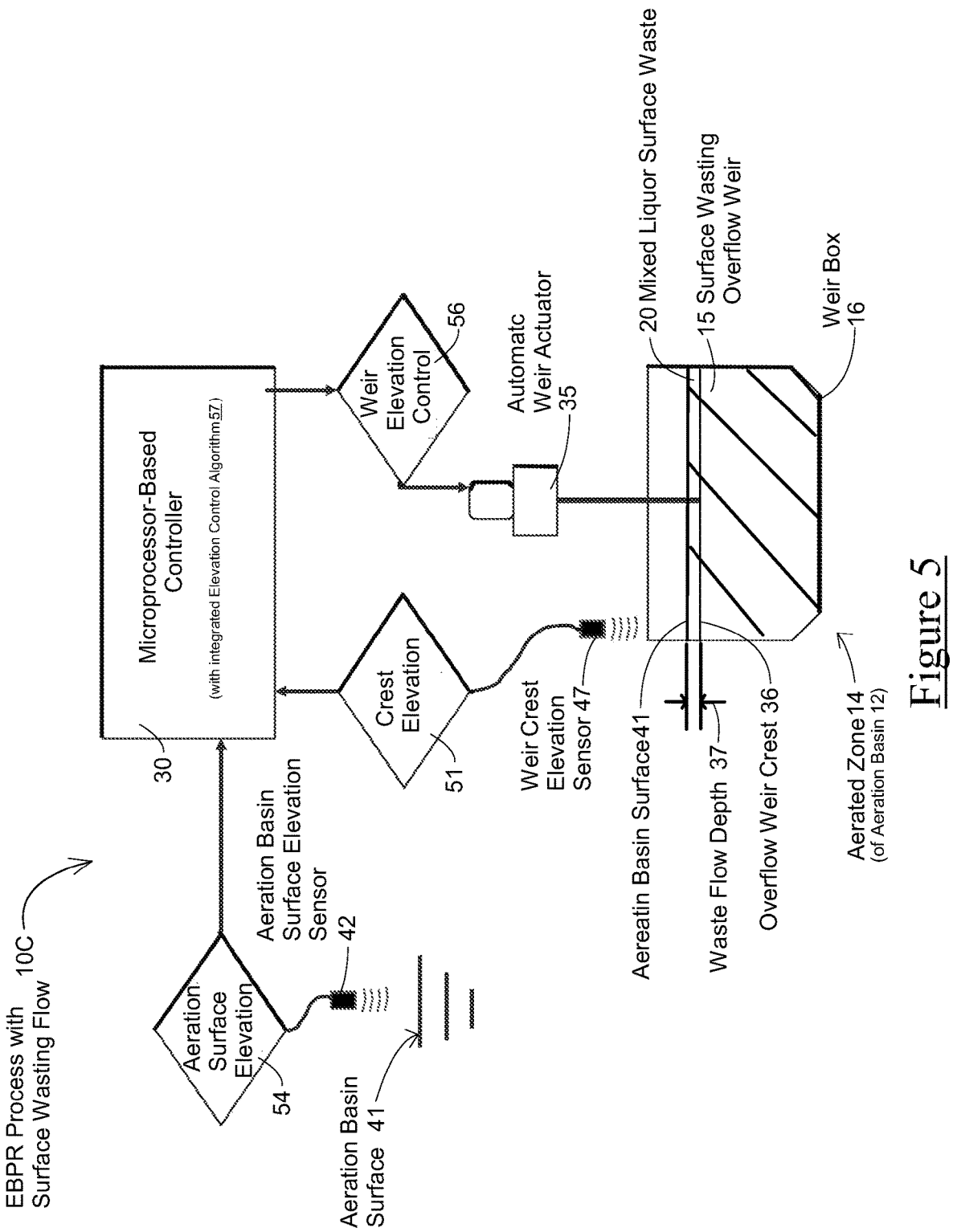
FIG. 5 is a schematic diagram detailing components controlling an automated overflow weir, in an embodiment of the present invention.

For the automated overflow weir method of the present invention 100, vital process variables are input, most preferably to the Microprocessor-Based Controller 30, enabling the accurate and precise control of the Mixed Liquor Surface Waste 20 skimmed form the Aeration Basin 12, as shown in FIG. 4. These process variables include an Aeration Surface Elevation 54, which must be compared with and correlated to the relative elevation of the Overflow Weir Crest 36. The Aeration Surface Elevation or more simply the "Surface Elevation" is sensed by an "Aeration Basin Surface Elevation Sensor" 42, as shown in FIGS. 4 and 5. The Aeration Surface Elevation is input to the Microprocessor-Based Controller 30, for use in an Elevation Control Algorithm 57, as programmed into the Microprocessor-Based Controller. The Elevation Control Algorithm is most preferably a standard type of control algorithm written in a conventional programming code, to direct the logical output instructions of the Microprocessor-Based Controller in the defined execution steps as disclosed herein. Elevation Control Algorithm is preferably integrated into the Microprocessor-Based Controller. A less preferred, alternative execution of the Elevation Control Algorithm is possible, from a personal or facility computer for example, or from a remote or a 'cloud based' processor or server.

In an alternative embodiment of the automated overflow weir method of the present invention 100, two or more of the Aeration Basin Elevation Sensors 42 may be installed the Aeration Basin 12, with the sensed Aeration Surface Elevation 54 from each, continually averaged by the Microprocessor-Based Controller 30, to compute the Aeration Surface Elevation for input into the Elevation Control Algorithm 57, again most preferably as programmed into the Microprocessor-Based Controller.

In another alternative embodiment of the automated overflow weir method of the present invention 100, the Aeration Surface Elevation 54 in the Aeration Basin 12 may be acquired using one or more ultrasonic level transmitters as the Aeration Basin Elevation Sensor 42.

In yet another an alternative embodiment of the automated overflow weir method of the present invention 100, the Aeration Surface Elevation 54 in the Aeration Basin 12 may be acquired using one or more radar level transmitters as the Aeration Basin Elevation Sensor 42.

As shown schematically in FIG. 5, a Crest Elevation 51 is measured by a Weir Crest Elevation Sensor 47, as preferred. Alternatively, if the Automatic Weir Actuator 35 is precisely indexed, the elevation of the Crest Elevation can be determined without the Crest Elevation Sensor, and the Crest Elevation could be gained directly from the calibrated position of the Automatic Weir Actuator 35, or instead continually measured using a high-resolution proximity sensor.

In another alternative embodiment of the automated overflow weir method of the present invention 100, the weir crest elevation for each Surface Wasting Weir is continually measured using a high-resolution camera and image interpretation software.

Figure 6:
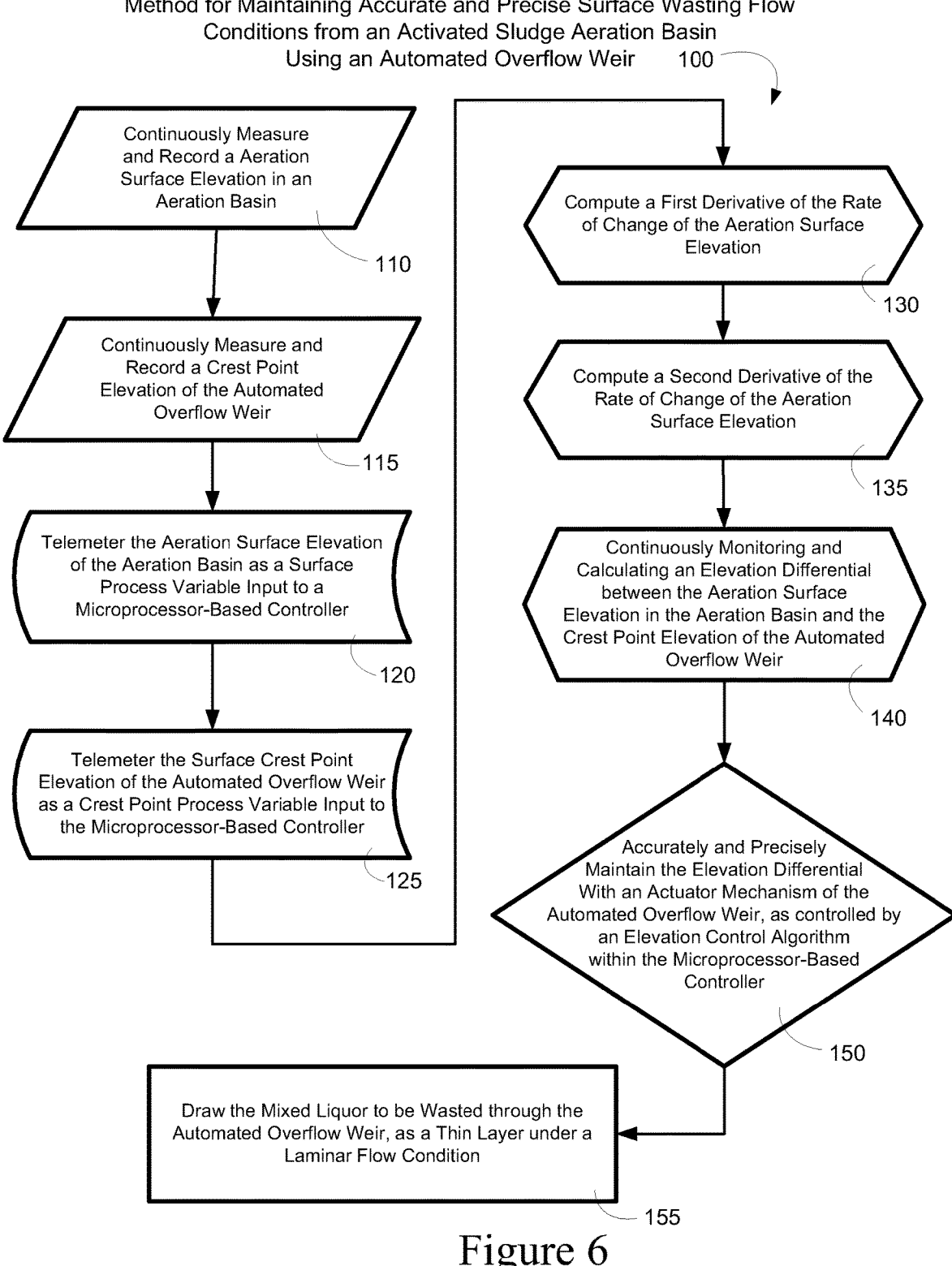
FIG. 6 is a stepwise logic flowchart of an operational method embodiment of the present invention.

As shown in the method step flowchart of FIG. 6, initial steps of executing a preferred embodiment of the automated overflow weir method of the present invention 100, is a "Continuous Measuring and Recording of a Surface Elevation in the Activated Sludge Aeration Basin" 110. This step is concurrent with a "Measuring and Recording of a Crest Point Elevation of the Automated Overflow Weir" 115. With the Crest Elevation 51 and the Aeration Surface Elevation 54 acquired and ready for input to the Microprocessor-Based Controller 30, a next step of "Telemetering the Surface Elevation of the Aeration Basin as an Aeration Surface Elevation Process Variable Input into the Microprocessor-Based Controller" 120 can occur. This step is concurrent with a step of "Telemetering a Crest Point Elevation of the Automated Overflow Weir as a Crest Elevation Process Variable Input into the Microprocessor-Based Controller" 125.

As preferably residing in the Microprocessor-Based Controller 30, or any computational element, such as a computer, a standard type of a control algorithm can be generated and employed as an Elevation Control Algorithm 57. With the Elevation Control Algorithm based on these two independent measured variable inputs of the Crest Elevation 51 and the Aeration Surface Elevation 54, the Microprocessor-Based Controller provides for both an accurate and a precise control of the depth of surface wasting flow over the overflow weir, without excessive oscillation of the overflow weir's movement and the resultant excessive oscillation in the depth of wasting flow through the overflow weir.

The Elevation Control Algorithm 57 executing the steps of the preferred embodiment of the automated overflow weir method of the present invention 100, as outlined in FIG. 6, further includes a step of "Computing a First Derivative of the Rate of Change of the Aeration Surface Elevation" 130.

This step is immediately followed by a step of "Computing a Second Derivative of the Rate of Change of the Aeration Surface Elevation" 135. The calculated "first derivative" is a rate of change over time, of the Aeration Surface Elevation 54 within the Aeration Basin 12 as sensed by the Aeration Basin Elevation Sensor 42, which is located proximate to the Aeration Basin Surface 41. The calculated "second derivative" is a rate of change over time, of the "first derivative". The second derivative can be considered an acceleration, or how fast the rate that the elevation of the Aeration Basin Surface changes, over time.

A primary purpose of the surface wasting, Overflow Weir 15 is to create a laminar flow of the Mixed Liquor Surface Waste 20 at the Aeration Basin Surface 41 towards the Overflow Weir Crest 36. An "Elevation Differential" 58, can be used to monitor and control the vertical height of the Mixed Liquor Surface Waste at the Overflow Weir Crest. The Elevation Differential is herein defined as the difference between the Aeration Surface Elevation 54, as sensed by the Aeration Basin Surface Elevation Sensor 42 less the Crest Elevation 51, subtracted from Aeration Surface Elevation, with the Crest Elevation measured by the Weir Crest Elevation Sensor 47.

A laminar or "straight-line", non-turbulent flow of fluids is highly preferable for skimming or surface wasting weir operations. When the waste flow depth, as exhibited in the Elevation Differential 58, oscillates to a value or depth greater than the desired and optimal range, a turbulent upwelling will occur. Turbulent upwelling in the Aerated Zone 14 draws Mixed Liquor 11 from a greater depth within the Aeration Basin 12, rather than from across the Aeration Basin Surface 41, as intended. If the desired Elevation Differential is not accurately and precisely monitored and maintained, the flow depth of the Mixed Liquor Surface Waste 20 over the Overflow Weir Crest 36 will oscillate at an undesirably wide range.

With the needed process variables, including the Aeration Surface Elevation 54, and the Crest Elevation 51, continuously measured and telemetered in real time to the Microprocessor-Based Controller 30, and the dynamically changing first derivative and second derivative values continuously computed, the automated overflow weir method of the present invention 100, can proceed. Next performed, is a step of "Continuously Monitoring and Calculating an Elevation Differential Between the Aeration Surface Elevation and the Crest Elevation of the Automated Overflow Weir" 140. Again, the required sensor generated signal monitoring and computational process steps in the automated overflow weir method of the present invention are achieved most preferably by use of the Microprocessor-Based Controller.

The Microprocessor-Based Controller 30 then employs the telemetry from Aeration Surface Elevation Sensor 42 and the Weir Crest Elevation Sensor 47 as inputs, for the required, instantaneously changing variable inputs for derivative and differential computations, and is able to perform a next step of "Accurately and Precisely Maintain the Elevation Differential with an Actuator Mechanism of the Automated Overflow Weir, as controlled by an Elevation Control Algorithm within the Microprocessor-Based Controller" 150. This step is vital, in that if the overflow depth is continuously oscillating above and below the desired set point range, the surface wasting process will not be effective in selecting against the growth of filamentous bacteria and in selecting for the retention and growth of the denser constituents of the activated sludge mixed liquor including aerobic granular sludge. The articulation of the Overflow Weir Crest 36 in this controlled manner, serves to "Draw the Mixed Liquor to be Wasted as a Thin Layer under a Laminar Flow Condition, into the Automated Overflow Weir" 155.

Advantages of the automated overflow weir method of the present invention 100 include a more accurate and precise maintenance of the desired depth of flow through the Overflow Weir 15, as compared to the SWAS Treatment Systems 10C with conventional operation of the Overflow Weir. Again, the Overflow Weir is operated optimally with the Elevation Differential 58 to result in the Waste Flow Depth typically within the narrow optimal range of approximately 1 cm to 2 cm, and thereby smoothly withdraw the Mixed Liquor Surface Waste 20 from the Aeration Basin Surface 41, and also create a laminar flow of the Mixed Liquor 11 suspension over the surface of the Aeration Basin 12 to the Overflow Weir Crest 36, and in this manner remove it as the Waste Activated Sludge 22 from the system.

Another advantage of the automated overflow weir method of the present invention 100 can be incorporated into existing or new SWAS Treatment Systems 10C, to better achieve or improve enhanced biological phosphorus removal (EBPR) and biological nitrogen removal (BNR), by improving the settling of the Activated Sludge 13, with increased energy efficiency.

An additional advantage of the automated overflow weir method of the present invention 100 is that the Elevation Control Algorithm 57 executed by the integral Microprocessor-Based Controller 30 utilizes the precisely measured process variables, including the Aeration Surface Elevation 54 and the Crest Elevation 51, together with derived variables including but not limited to the first derivative and the second derivative of the rate of change in the water surface level in the aeration basin, to provide for accurate and precise control of the waste depth flow over the surface wasting Overflow Weir 15.

A primary objective of the automated overflow weir method of the present invention 100 is to accurately and precisely maintain a desired Waste Flow Depth 37 over the Overflow Weir 15 within an optimal, narrow range of approximately 1 cm to 2 cm, to most effectively serve to withdraw a portion of the activated sludge mixed liquor from the aeration basin. Additionally, another objective is to create a laminar flow of the mixed liquor suspension over the surface of the aeration basin towards the weir crest and in this manner remove it as waste activated sludge (WAS) from the system.

With these advantages and objectives the present invention's innovations include an independent and simultaneous measurement of the Aeration Surface Elevation 54 in the Aeration Basin 12, and the Crest Elevation 51 of the automated Overflow Weir 15. An additional innovation is the use of the Microprocessor-Based Controller 30 as an integral component of the automated overflow weir method of the present invention 100, executing the Elevation Control Algorithm based on the above listed independent measured variable inputs to provide for accurate and precise control of the waste flow depth over the surface wasting Overflow Weir, without excessive oscillation of the Overflow Weir movement, and the resultant excessive oscillation of the depth of flow over the Overflow Weir.

For this Detailed Description of Specific Embodiments, the terms "connected", "attached", "coupled" and "mounted" refer to any form of interaction between two or more elements, including mechanical, electrical, magnetic, electromagnetic, fluid, and thermal interaction. Two components may be functionally coupled with or to each other, even though they are not in direct contact with each other.

Also, the terms "approximately" or "approximate" are employed herein throughout, including this detailed description and the attached claims, with the understanding that is denotes a level of exactitude commensurate with the skill and precision typical for the particular field of endeavor, as applicable.

Additionally, the terminology used in this Detailed Description of Specific Embodiments is to be interpreted according to ordinary and customary usage in the field of the invention as exemplified in the pertinent U.S. and International Patent Classification Codes, and equivalent codes in other patent classification systems.

The word "embodiment" is used herein to mean "serving as an example, instance, or illustration." Any embodiment described herein is not necessarily to be construed as preferred or advantageous over other embodiments. While the various aspects of the embodiments are presented in drawings, the drawings are not necessarily drawn to scale.

Additionally, reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that the above Detailed Description of Specific Embodiments includes the referenced figures and following claims, and is more simply referred to herein as the "description" or the "disclosure". In this description, various features are sometimes grouped together in a single embodiment, figure, or written explanation thereof for the purpose of streamlining this disclosure. However, this method of disclosure is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this description are hereby expressly incorporated into this description and disclosure, with each claim standing on its own as a separate embodiment. This description includes all permutations of the independent claims with their dependent claims.

In compliance with the statutes, the invention has been described in language more or less specific as to structural features and process steps where applicable. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A method for a wasting of a mixed liquor in an activated sludge wastewater treatment system using an automated overflow weir, said method comprising the steps of:
   a) continuously measuring and recording an aeration surface elevation of an aeration basin within the activated sludge wastewater treatment system;
   b) continuously measuring and recording a crest point elevation of the automated overflow weir;

c) telemetering the aeration surface elevation of the aeration basin as a surface process variable input into a microprocessor-based controller;

d) telemetering a crest elevation of the automated overflow weir as a crest point process variable input into the microprocessor-based controller;

e) computing a first derivative of the rate of change of the aeration surface elevation with the microprocessor-based controller;

f) computing a second derivative of the rate of change of the aeration surface elevation with the microprocessor-based controller;

g) continuously measuring and calculating an elevation differential, as the difference between the aeration surface elevation in the aeration basin and the crest elevation of the automated overflow weir;

h) accurately and precisely maintaining the elevation differential with an actuator mechanism of the automated overflow weir, the automatic actuator mechanism as controlled by an elevation control algorithm within the microprocessor-based controller; and i) withdrawing a mixed liquor surface waste as a thin layer under a laminar flow condition, into the automated overflow weir.

2. The method of claim 1, including the additional steps of:

j) accurately and precisely maintaining a waste flow depth over the surface wasting weir of approximately 1 cm to 2 cm using the elevation control algorithm programmed in a microprocessor-based controller.

3. The method of claim 1, including the additional step of:

j) fabricating a multiple of V-shaped notches in the overflow weir to provide improved accuracy and precision in the flow waste activated sludge over the overflow weir.

4. The method of claim 1, including the additional step of:

j) intermittently operating the surface wasting weir during a specific time period within a 24-hour period of time.

5. The method of claim 1, including the additional step of:

j) installing a multiple of aeration basins, each of the multiple of aeration basins operating in parallel, and the automated overflow weir in each of the multiple of aeration basins is controlled independently among the multiple of aeration basins.

6. The method of claim 1, including the additional step of:

j) installing a multiple of aeration basins, each of the multiple of aeration basins operating in parallel, and the automated overflow weir in each of the multiple of aeration basins is controlled in a coordinated manner among the multiple of aeration basins.

7. The method of claim 1, wherein the step of continuously measuring and recording an aeration surface elevation of an aeration basin within the activated sludge wastewater treatment system, further includes installing a multiple of water surface elevation sensors in the aeration basin and the aeration surface elevation measured by each multiple of water surface elevation sensors is continually averaged by the microprocessor-based controller.

8. The method of claim 7, wherein the step of continuously measuring and recording an aeration surface elevation of an aeration basin within the activated sludge wastewater treatment system, further includes employing an ultrasonic level transmitter for the water surface elevation sensor.

9. The method of claim 7, wherein the step of continuously measuring and recording an aeration surface elevation of an aeration basin within the activated sludge wastewater treatment system, further includes employing a radar level transmitter for the water surface elevation sensor.

10. The method of claim 7, wherein the step of a crest point elevation of the automated overflow weir within the activated sludge wastewater treatment system, further includes employing a high-resolution proximity sensor for the water surface elevation sensor.

11. The method of claim 7, wherein the step of a crest point elevation of the automated overflow weir within the activated sludge wastewater treatment system, further includes employing a using a high-resolution camera and image interpretation software for the water surface elevation sensor.

12. The method of claim 1, including the additional step of:

j) intermittently operating the surface wasting weir at a recurring interval of time.

* * * * *